(12) United States Patent
Mendel et al.

(10) Patent No.: US 11,476,872 B2
(45) Date of Patent: Oct. 18, 2022

(54) PROTECTION AGAINST SIDE-CHANNEL ATTACKS

(71) Applicant: Infineon Technologies AG, Neubiberg (DE)

(72) Inventors: Florian Mendel, Munich (DE); Bernd Meyer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 623 days.

(21) Appl. No.: 16/504,863

(22) Filed: Jul. 8, 2019

(65) Prior Publication Data

US 2020/0014404 A1    Jan. 9, 2020

(51) Int. Cl.
*H03M 13/00*    (2006.01)
*H03M 13/27*    (2006.01)
*G06F 21/75*    (2013.01)
*H04L 9/00*    (2022.01)

(52) U.S. Cl.
CPC ........ *H03M 13/271* (2013.01); *G06F 21/755* (2017.08); *H03M 13/2742* (2013.01); *H04L 9/003* (2013.01)

(58) Field of Classification Search
CPC .................. H03M 13/271; H03M 13/2742
See application file for complete search history.

(56) References Cited

U.S. PATENT DOCUMENTS

| | | | | |
|---|---|---|---|---|
| 8,169,887 B2* | 5/2012 | Tsai | ........................ | H04L 5/003 370/328 |
| 8,832,450 B2* | 9/2014 | Ciet | ...................... | H04L 9/0643 713/181 |
| 8,930,685 B2* | 1/2015 | Fontignie | ................... | G06F 8/63 713/2 |
| 9,323,764 B2* | 4/2016 | Goodman | ............... | G06F 16/13 |
| 2010/0005133 A1* | 1/2010 | Choi | ........................ | G06F 7/586 708/491 |
| 2018/0307418 A1* | 10/2018 | Brown | ..................... | G06F 3/067 |

FOREIGN PATENT DOCUMENTS

WO    2015056236 A1    4/2015

OTHER PUBLICATIONS

"Fisher-Yates shuffle", Wikipedia, accessed online at https://en.wikipedia.org/w/index.php?title=Fisher-Yates_shuffle&oldid=846733135 on Mar. 21, 2019.

(Continued)

*Primary Examiner* — Esaw T Abraham
(74) *Attorney, Agent, or Firm* — Murphy, Bilak & Homiller, PLLC (57) ABSTRACT

A method is proposed for copying a source array into a target array, wherein both the source array and the target array have at least two elements, wherein each element has a value, in which the elements of the source array are copied into the target array in the sequence of a random permutation, wherein, after a step of copying an element of the source array into the target array, the source array, the target array or the source array and the target array are rotated. A device is also indicated accordingly.

12 Claims, 3 Drawing Sheets

(56) References Cited

OTHER PUBLICATIONS

Bayrak, Ali Galip, et al., "An Architecture-Independent Instruction Shuffler to Protect against Side-Channel Attacks", ACM Transactions on Architecture and Code Optimization, vol. 8, No. 4, Article 20, Jan. 2012, pp. 1-19.
Brasser, Ferdinand, et al., "DR.SGX: Hardening SGX Enclaves against Cache Attacks with Data Location Randomization", Sep. 2017, accessed online at https://arxiv.org/pdf/1709.09917 on Mar. 21, 2019, pp. 1-16.
Hazra, Tapan Kumar, et al., "File Encryption using Fisher-Yates Shuffle", 2015 International Conference and Workshop on Computing and Communication (IEMCON), 2015.
"Kerckhoffs's principle", Wikipedia, accessed online at https://en.wikipedia.org/wiki/Kerckhoffs%27s_principle on Jul. 8, 2019.
Luo, Pei, et al., "Towards Secure Cryptographic Software Implementation Against Side-Channel Power Analysis Attacks", 2015 IEEE 26th International Conference on Application-specific Systems, Architectures and Processors (ASAP), 2015, pp. 144-148.

* cited by examiner

Fig.3 though the present invention has been illustrated and described
PROTECTION AGAINST SIDE-CHANNEL ATTACKS

TECHNICAL FIELD

The present application is directed to protection against side-channel attacks in computer systems.

BACKGROUND

In the event of a side-channel attack, a concrete physical implementation of a method is attacked. An implementation of this type may be present in hardware and/or in software. As a circuit, every physical implementation of a cryptographic method in a computer system provides an attacker with the facility to read off physical measured quantities. Measured quantities of this type are, for example, a duration of the performance of the method, a temporal distribution of a power consumption of the circuit or an electromagnetic radiation of the circuit currently in operation.

These measured quantities are related to the performance of the cryptographic method and the ensuing intermediate and final results. The attacker can thus establish relationships or correlations between the measured quantities defined by him and the results of the cryptographic operations.

Kerckhoff s principle (see, e.g., en.wikipedia.org/wiki/Kerckhoffs's_principle) states that the security of an encryption method is based on the secrecy of the key rather than on the secrecy of the encryption algorithm. According to Kerckhoff's principle, inputs and outputs and also the description of the method should be assumed as available to an attacker as initial values for the analysis of the encryption.

Side-channel attacks can furthermore be used in practice with simple means to break unprotected implementations of methods that are actually regarded as secure from a mathematical perspective in the conventional model, and to extract the associated secret keys. It is frequently already sufficient here to use a conventional digital storage oscilloscope to capture the measured quantities and a computer for the statistical evaluation of the measured quantities.

A known approach to defending against side-channel attacks is a randomization of memory accesses, for example during the copying of memory areas. Data words of a field (also referred to as an array) are transmitted in a randomly permutated sequence. An approach of this type is frequently used, for example, in an initialization of key registers.

The problem here is that read or write accesses to specific data words of a source array or a target array can nevertheless have a characteristic power signature, as a result of which they are recognizable in the power consumption of the electronic circuit over time, or that a spatial localization of memory accesses is possible, for example, in the case of accesses to registers through the use of an electromagnetic probe for a small area of the security chip in which the register concerned is disposed.

In such cases, the attacker can (at least partially) reconstruct the permutation of the access sequence and directly or statistically evaluate correlations based on individual data words.

SUMMARY

The object of the invention is to avoid the aforementioned disadvantages and, in particular, enable an improved protection against side-channel attacks.

This object is achieved according to the features of the independent claims. Preferred embodiments can be found, in particular, in the dependent claims.

In order to achieve the object, a method is indicated for copying a source array into a target array:
  wherein both the source array and the target array have at least two elements, wherein each element has a value,
  in which the elements of the source array are copied into the target array in the sequence of a permutation,
  wherein, after a step of copying an element of the source array into the target array, the source array, the target array or the source array and the target array are permutated.

The source array (and also the target array) comprise a field which in each case has a plurality of elements. Each element can have a value. This value may comprise, for example, at least one bit, and the value may furthermore, for example, be an integer or a floating-point number.

The permutation comprises, for example, a rotation, a rearrangement (shuffling) or a cyclic or acyclic permutation.

The permutation is, for example, a random permutation.

The permutation of the source array and target array after each copying step can be implemented, for example, by means of a rotation, but any other (cyclic) permutation can also be used.

It should be noted here that the term "random" in the context described here comprises not only actual randomness but also an apparent randomness or a pseudorandomness. Depending on the field of application, a more or less strongly defined randomness can be chosen. It is also possible, for example, to predefine a specific distribution which meets the randomness requirements by means of deterministically defined numbers.

The copying entails, in particular, an operation with a plurality of steps at the end of which the target array has the same values as the source array.

The number of elements of the source and target array is, for example, identical The target array has at least as many elements as the source array.

The method can be implemented by means of hardware, e.g. taking account of at least one cyclic shift register, or by means of software, or can have a combination of hardware and software.

One possible implementation consists in temporarily storing each step of the operation in a register.

One option is for more elements to be provided than data words provided in an application. In this case, the data words can be stored in the elements of the source array and the remaining elements are filled with predefined or random values. The copying into the target array then begins as described herein.

In one application, the source array contains a key for a cryptographic operation; this key is intended to be copied into the target array without a side-channel attack being able to recognize the values of the elements of the arrays. The key comprises, for example, a plurality of elements which are provided as the source array.

Statistical correlations between spatial and temporal signatures of a power profile which can occur during an access to specific memory locations of the source array and/or the target array and the associated stored data words are reduced or avoided by means of the solution proposed here. A side-channel attack on the values stored in the elements is thus largely hindered or prevented.

In one development, at least one cyclic shift register is provided for the source array and the target array to store the at least two elements.

In one development, a loop is provided which predefines a number of iterations which corresponds to the number of the at least two elements, wherein, for each iteration,
 the value is copied from the source array into the target array according to the sequence of the random permutation,
 the source array and the target array are rotated through a predefined position.

The predefined position may, for example, be 1 for both arrays, i.e. the source and target array are in each case shifted through one position. In the case of a cyclic shift register, a shift through a position to the left, for example, can take place.

In one development, a loop is provided which predefines a number of iterations which corresponds to the number of the at least two elements, wherein, for each iteration,
 the value is copied from the source array into the target array according to the sequence of the permutation,
 the source array is rotated through a first number of positions, wherein the first number is defined by a first digit,
 the target array is rotated through a second number of positions, wherein the second number is defined by a second digit,
 wherein the first random number and the second random number are in each coprime to the number of elements of the respective array.

In one development, the first number and/or the second number is/are in each case a random number or a deterministically defined number.

The source array is thus rotated through the first number of positions corresponding to the first number and the target array is rotated through the second number of positions corresponding to the second number.

It should be noted here that the number of elements of the array is preferably identical for the source and the target array.

In one development, the first number and the second number are defined for the total number of the iterations.

In one development, the method is used for the initialization of at least one key register.

In one development, each element has a value which is representable by at least one bit.

A device is furthermore indicated for copying a source array into a target array, wherein both the source array and the target array have at least two elements, wherein each element has a value,
 1comprising a processing unit which is configured to carry out the following steps:
  copying the elements of the source array into the target array in the sequence of a permutation,
  rotating the source array, the target array or the source array and the target array after a step of copying an element of the source array into the target array.

The processing unit specified here can be designed, in particular, as a processor unit and/or an at least partially hardwired or logical circuit arrangement which is configured, for example, in such a way that a method as described herein can be carried out. Said processing unit may be or may comprise any type of processor or calculator or computer with correspondingly necessary peripherals (memory, input/output interfaces, input/output devices, etc.).

The explanations above relating to the method apply accordingly to the device. The device can be implemented in one component or can be distributed in a plurality of components.

The aforementioned object is also achieved by means of a system comprising at least one of the devices described here.

A device is furthermore indicated for copying a source array into a target array, wherein both the source array and the target array have at least two elements, wherein each element has a value, comprising:
 means for copying the elements of the source array into the target array in the sequence of a permutation,
 means for rotating the source array, the target array or the source array and the target array after a step of copying an element of the source array into the target array.

A computer program product is proposed which is directly loadable into a memory of a digital computer, comprising program code parts which are suitable for carrying out the steps of one of the methods described herein.

A computer-readable storage medium is also indicated which comprises instructions executable by a computer which are suitable so that the computer carries out the steps of one of the methods described herein.

BRIEF DESCRIPTION OF THE FIGURES

The characteristics, features and advantages of this invention described above and the manner in which they are achieved will now be explained in detail in conjunction with the following schematic description of example embodiments with reference to the drawings. Elements which are the same or which produce the same effect can be denoted with the same reference numbers for the sake of clarity.

In the drawings.

DETAILED DESCRIPTION

The examples proposed here relate to approaches which hinder and, in particular, prevent statistical correlations between spatial and temporal signatures of the power profile which can occur during the access to specific memory locations of a source array or target array and the stored data words.

The following countermeasures are primarily used in order to protect implementations of security applications against side-channel attacks. Statistical correlations between results of individual calculation steps on masked data and the associated unmasked values are hindered through randomized, masked representations of intermediate results. Attacks such as Differential Power Analysis (DPA) and Differential Electromagnetic Analysis (EMA) are hindered or averted in this way. If data to be protected are distributed among a plurality of physical units, an attacker can furthermore be forced to evaluate differences between different places in the power profile which are, a priori, unknown to him, as a result of which the complexity of the attacks increases significantly.

According to a further option, individual calculations essentially remain correlated with the actually processed data even if said data are masked and randomized. Different techniques are used in order to worsen (i.e., reduce) the signal-to-noise ratio and therefore hinder an attack on individual measurements:

The measurable signal can be significantly attenuated through the use of special electronic gates, suitable synthesis and layout measures (symmetric layout of the circuit), balancing of signal lines and the like.

The desired calculation to be carried out is "hidden" through hiding measures in a random manner in a sequence of additional execution steps. If the time of the performance of the actual calculation is not recognizable for the attacker, hiding measures of this type reduce the on average measurable signal. In this way, an attacker can furthermore be prevented from improving the signal-to-noise ratio through repeated measurement of the same calculation and by using a statistical averaging of the measured values obtained. Attacks such as Single Power Analysis (SPA) or template attacks can be hindered or averted in this way.

According to one example embodiment, an algorithm is proposed which copies a memory area consisting of data words from a source array into a target array. This is done, for example, during an initialization of key registers.

One aim is to protect this copying procedure, for example, against side-channel attacks by presenting an attacker during each copying procedure of this type with measured values which are as random as possible, so that he is barely able or is totally unable to deduce the copied data words.

By way of example, both the source array and the target array in each case have n elements (where n>0). This produces a number n of data words to be copied. Each data word comprises, for example, at least one bit.

A permutation perm[ ] of n elements is represented as an array of length n, containing the numbers 0 to n−1 in a random sequence. The associated permutation π then maps the element at the position i onto the position $\pi(i) := \text{perm}[i]$ for $0 \leq i \leq n-1$.

A subprogram gen_rand_perm(perm[], n) generates a random permutation perm[] of the n elements.

The source array is designated as in[ ] and the target array as out[ ].

One possible implementation of a hiding measure on the basis of which data words are copied in a permutated sequence from the source array into the target array can be indicated in the following pseudocode notation:

```
gen_rand_perm(perm[ ], n)
for i ← to n−1 do
    out[perm[i]] ← in[perm[i]]
```

A corresponding function gen_rand_perm( ) in the C programming language could be implemented as follows:

```
void gen_rand_perm(uint32_t perm[ ]) {
    uint32_t i, s, t;
    for (i = 0; i < SIZE−1; i++) {
        s = rand( )%(SIZE−i);
        t = perm[i];
        perm[i] = perm[i+s];
        perm[i+s] = t;
    }
}
```

Here, SIZE designates a global variable which predefines the size of the array (i.e. the number of n elements). The value of the SIZE variable may, for example, be 16. i is the control variable which is incremented from 0 to SIZE-2. The variable s supplies a random number between 0 and (SIZE-i-1). For each increment of the control variable i, a value is stored randomly at a different position in the array perm[ ]. If the FOR loop reaches its end (i.e. the condition i<SIZE-1 is no longer fulfilled), the values 0 to 15 are randomly distributed in the array perm[ ]. As a result, on the basis of the function gen_rand_perm( ) an initial occupancy of the array des Arrays perm[ ] with the values 0 to 15 according to perm[0]=0
perm[1]=1
perm[2]=2
perm[3]=3
perm[4]=4
perm[5]=5
perm[6]=6
perm[7]=7
perm[8]=8
perm[9]=9
perm[10]=10
perm[11]=11
perm[12]=12
perm[13]=13
perm[14]=14
perm[15]=15 is changed, for example, into the following occupancy:

perm[0]=9
perm[1]=3
perm[2]=8
perm[3]=0
perm[4]=1
perm[5]=10
perm[6]=14
perm[7]=7
perm[8]=5
perm[9]=15
perm[10]=4
perm[11]=11
perm[12]=13
perm[13]=12
perm[14]=2
perm[15]=6

It should be noted here that the term "random" used here can comprise not only pure non-deterministic randomness, but also a pseudorandomness or apparent randomness. Some random number generators thus provide only pseudorandom numbers. However, these pseudorandom numbers are as usable for the solutions proposed here as deterministic numbers which merely appear to be random. For example, a deterministic sequence of numbers (e.g. predefined or previously stored numbers) can also be used as random numbers. These numbers may appear to be random, particularly if the sequence is not previously known to an attacker.

To summarize, the term "random number" used here also comprises pseudorandom numbers or deterministic sequences of numbers which may appear to be random under certain conditions. Sequences of numbers which implement a specific statistical distribution, e.g. an equal distribution or a noise, may similarly appear to be random. This can also be achieved with non-random (i.e. deterministic, for example algorithmically generated) numbers.

The present examples avoid or reduce a statistical correlation between spatial and temporal signatures of the power profile which can occur during access to specific memory locations of a source array or target array and the associated stored data words. This is achieved, for example, through additional permutation of the contents of the source array and target array during the transmission of the data words.

This additional permutation of the contents of the source array and target array can be achieved, for example, through cyclic rotation of the memory areas during the copying procedure. The associated pseudocode of a possible algorithm reads as follows:

```
gen_rand_perm(perm[ ], n)
for i ← 0 to n−1 do
    out[(perm[i] − i ) mod n] ← in[(perm[i] − i ) mod n]
    t ← in[0]          /* Rotate source array */
    for j ← 0 to n−2 do
        in[j] ← in[j + 1]
    in[n − 1] ← t
    t ← out[0]         /* Rotate target array */
    for j ← 0 to n−2 do
        out[j] ← out[j + 1]
    out[n − 1] ← t
```

Explanation of the Algorithm:

A random permutation of the n elements of the array perm[ ] is first generated, as explained above. The positions of the n elements are randomly interchanged.

This is followed by a FOR loop which increments the control variable i. The control variable i assumes values from 0 to n−1.

In the row out[(perm[i]−i) mod n] F in[(perm[i]−i) mod n]

the value of an element of the source array is assigned to an element of the target array: For i=0 and perm[i]=9, the value of the element in[9] is assigned accordingly to the element out[9]. The source array and the target array are then rotated. The result of the rotation serves as the starting point for the next assignment: In the next iteration, for i=1 and perm[i]=3, the value of the element in[2] is therefore assigned to the element out[2]. This is again followed by a rotation of the source array and target array. The entire process is repeated until the end of the FOR loop, until the source array and the target array are finely identical. The modulo operation "mod n" ensures that the expression perm[i]−i is restricted to values from 0 to n−1. A procedure of copying the source array into the target array is thus achieved, in each case providing different signatures of the power profile and therefore allowing barely recognizable correlations for an attacker to be able to deduce the copied data.

An example of an implementation of a corresponding function hiding_algorithm2( ) in the C programming language reads as follows:

```
void hiding_algorithm2(uint32_t out[ ], uint32_t in[ ],
    uint32_t perm[ ]) { uint32_t i, j, t;
    gen_rand_perm(perm);   /* generates random permutation */
    for (i = 0; i < SIZE; i++) {
        /* Copy next data word */
        out[(perm[i]+SIZE-i)%SIZE] = in[(perm[i]+SIZE-i)%SIZE];
        /* Rotate source array */
        t = in[0];
        for (j = 0; j < SIZE-1; j++)
            in[j] = in[j+1];
        in[SIZE-1] = t;
        /* Rotate target array */
        t = out[0];
        for (j = 0; j < SIZE-1; j++)
            out[j] = out[j+1];
        out[SIZE-1] = t;
    }
}
```

The target array out[ ] and the source array in[ ] and also an array perm[ ] are transferred to the function hiding algorithm2 for a random permutation. "% SIZE" corresponds here to the modulo operator which ensures that only values from 0 to SIZE-1 can be defined.

The approach proposed here thus offers the advantage that a specific data word is read from each address of the source array and is written to each address of the target array with the same probability. The probability is formed, for example, via the equal distribution of all permutations generated by gen_rand_perm(perm[], n).

A multiplicity of possible implementations exist. The code segments indicated here represent examples of possibilities, so that an attacker is now barely able or is totally unable to establish any statistical relationship between the attack on a specific memory location (through the power signature or the position of a register) and a specific data word.

A cyclic shift register for storing the n data words can be used, for example, to implement the approach described here in hardware. The rotation, described in the above algorithm, of the data words stored in the source array and target array can be achieved accordingly by means of a timing of the cyclic shift register.

The proposed implementation hinders or prevents statistical correlations between spatial and temporal signatures of the power profile which can occur during access to specific memory locations of a source array or target array and the associated stored data words.

This is achieved through additional permutation of the contents of the source array and target array during the transmission of the data words. In this way, the relationship prevailing in a known implementation between the address or memory location and the data word read or written in the event of an access is nullified.

Figure 1:
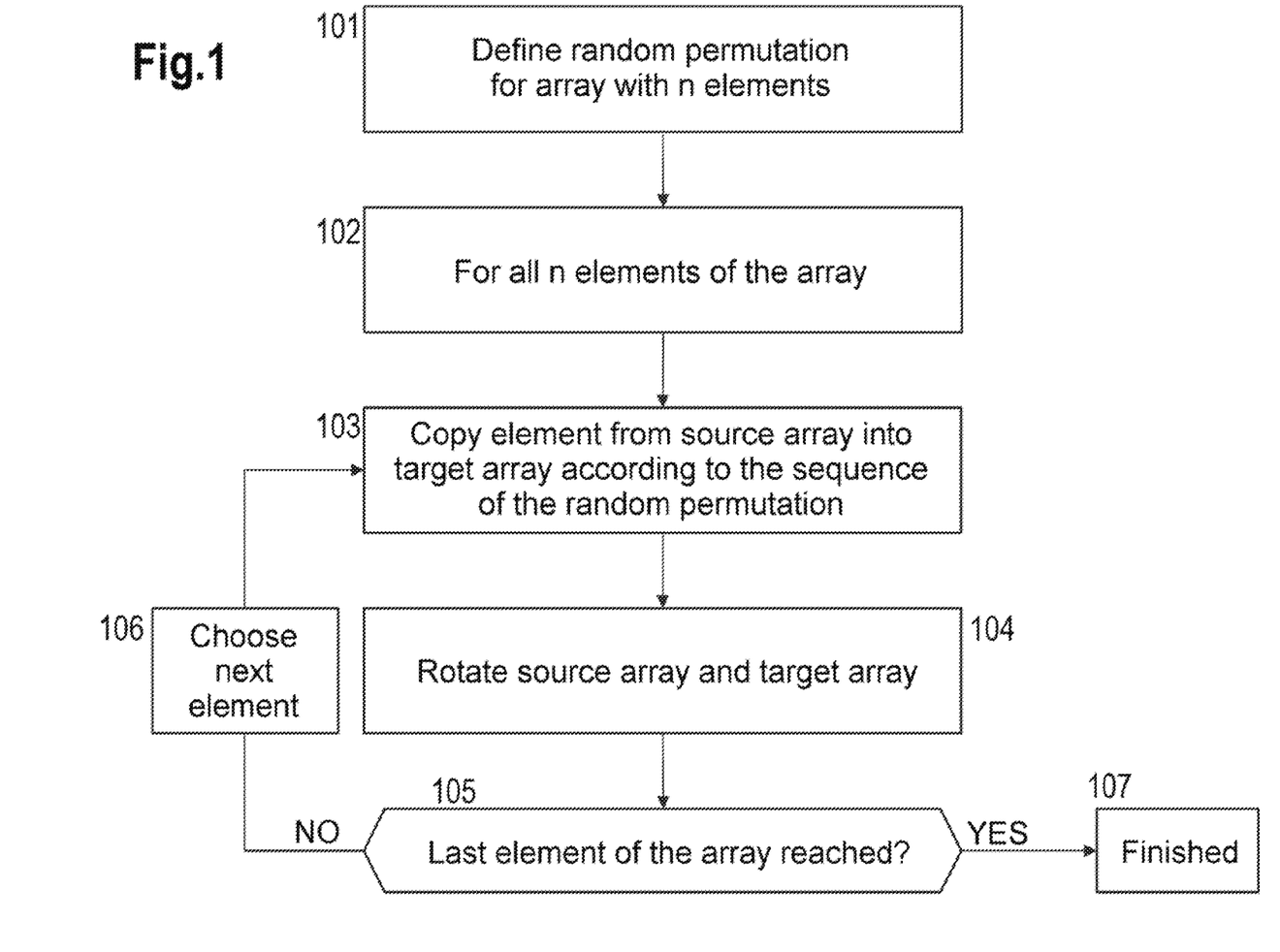
FIG. 1 shows an example of a flow diagram which illustrates a copying of elements of a source array into a target array.

FIG. 1 shows an example of a flow diagram with steps of a method for copying the source array into the target array.

In a step 101, the random permutation is defined for the array with n elements. This corresponds to the function gen randperm explained above.

In a step 102, the loop designed, by way of example, as a FOR loop in the above code segments, begins: in a step 103, an element is copied from the source array into the target array for all n elements of the array according to the sequence of the previously defined random permutation. In other words, the elements of the array are therefore processed in a scrambled sequence. In a step 104, the source array and target array are rotated in each case through at least one position. In a step 105, a check is carried out to determine whether the last element of the array has been reached (i.e. whether the end of the loop has been reached). If so, the process branches to a step 107 and the method of copying from the source array into the target array is ended. If all elements of the array have not yet been copied, the process branches to step 106 and the next element of the array is selected (i.e. the next iteration of the FOR loop is initiated). After step 106, the process branches again to step 103.

Variant: Random rotation of the source array and target array

According to one embodiment, the contents of the source array and target array are rotated through a random or predefined chosen number of positions. This rotation value is preferably coprime to the number of elements n of the data words to be copied.

In order to simplify the following example, it is assumed that the number of elements n is even. The associated pseudocode with random rotation of the source array and target array reads as follows:

```
gen_rand_perm(perm[ ], n)
a ← (rand( )mod n) | 1 /* Random number a */
b ← (rand( )mod n) | 1 /* Random number b */
for i ← 0 to n-1 do
    out[(perm[i] - b*i ) mod n] ← in[(perm[i] - a*i ) mod n]
    /* Rotate source array through a positions */
    t ← in[0]; j ← 0; s ← a;
    do
        in[j] ← in[s]
        j ← s; s ← s + a mod n;
    while (s ≠ 0)
    /* Rotate target array through b positions */
    t ← out[0]; j ← 0; s ← b;
    do
        out[j] ← out[s]
        j ← s; s ← s + b mod n;
    while (s ≠ 0)
```

If the number of elements n is not even, the random numbers a and b can be defined as random numbers coprime to n according to:

a←rand( )mod n where gcd(a, n)=1
b←rand( )mod n where gcd(b, n)=1

The function gcd(k, l) provides the greatest common divisor of two numbers k and l.

Here, a and b represent randomly defined offsets, wherein the offset a is used for the rotation of the source array and the offset b for the rotation of the target array.

In the row
out[(perm[i]−b*i)mod n] F in[(perm[i]−a*i)mod n],
the value of an element of the source array is assigned to an element of the target array, wherein the source array in[ ] is additionally shifted by the offset a and the target array out[ ] by the offset b.

An example of an implementation of the corresponding function hiding_algorithm3( ) in the C programming language reads as follows (in this example, the global variable SIZE is an even number):

```
void hiding_algorithm3(uint32_t out[ ], uint32_t in[ ],
    uint32_t perm[ ]) { uint32_t a, b, i, j, s, t;
    gen_rand_perm(perm); /* generates random permutation */
    /* Generate random offsets a and b */
    a = (rand( )%SIZE) | 1;
    b = (rand( )%SIZE) | 1;
    for (i = 0; i < SIZE; i++) {
        /* Copy next data word */
        out[(perm[i]+b*(SIZE-i))%SIZE] = in[(perm[i]+a*(SIZE-i))%SIZE];
        /* Rotate source array */
        t = in[0];
        j = 0;
        s = a;
        do {
            in[j] = in[s];
            j = s;
            s = (s+a)%SIZE;
        } while (s != 0);
        in[j] = t;
        /* Rotate target array */
        t = out[0];
        j = 0;
        s = b;
        do {
            out[j] = out[s];
            j = s;
            s = (s+b)%SIZE;
        } while (s != 0);
        out [j] = t;
    }
}
```

Figure 2:
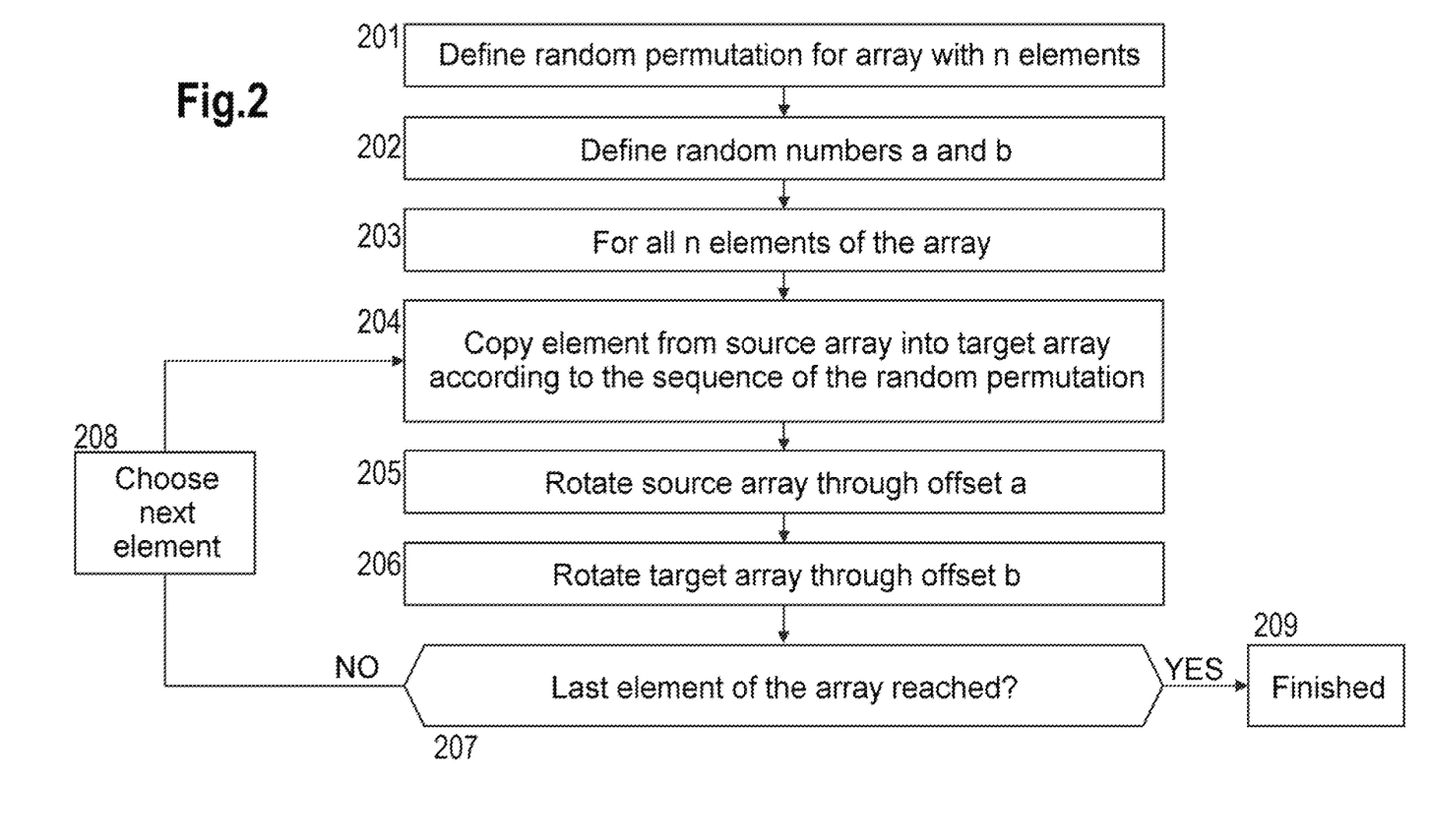
FIG. 2 shows an example of an alternative flow diagram which illustrates a copying of elements of a source array into a target array.

FIG. 2 shows an example of a flow diagram with steps of a method for copying the source array into the target array.

In a step 201, the random permutation is defined for the array with n elements. This corresponds to the function gen randperm explained above.

In a step 202, the random numbers a and b are defined which are preferably coprime to the number of n elements.

In a step 203, the loop designed, by way of example, as a FOR loop in the above code segments, begins: in a step 204, an element is copied from the source array into the target array for all n elements of the array according to the sequence of the previously defined random permutation. In other words, the elements of the array are therefore processed in a scrambled sequence. In a step 205, the source array is rotated through the offset a and, in a step 206, the target array is rotated through the offset b. In a step 207, a check is carried out to determine whether the last element of the array has been reached (i.e. whether the end of the loop has been reached). If so, the process branches to a step 209 and the method of copying from the source array into the target array is ended. If all elements of the array have not yet been copied, the process branches to step 208 and the next element of the array is selected (i.e. the next iteration of the FOR loop is initiated). After step 208, the process branches again to step 204.

Figure 3:
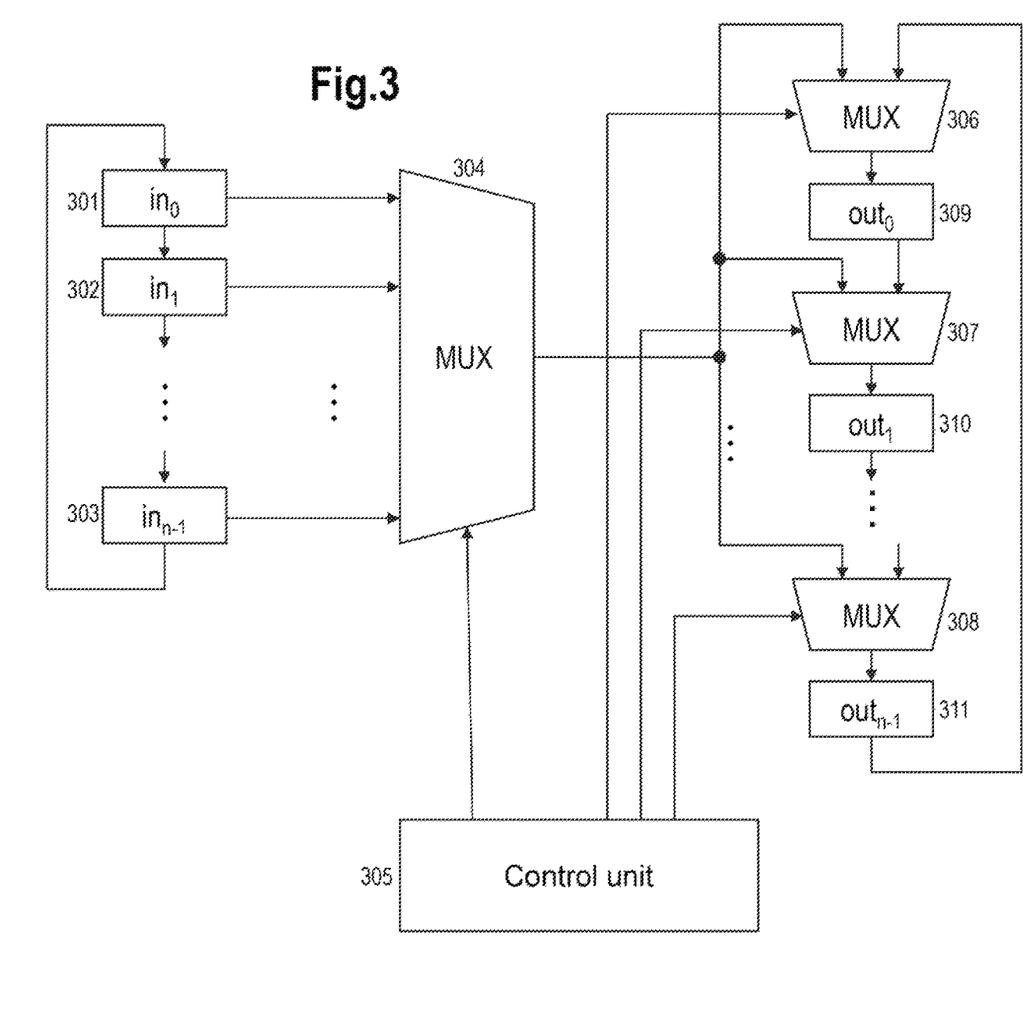
FIG. 3 shows a schematic arrangement for implementing the solutions proposed here.

FIG. 3 shows a schematic arrangement for implementing the solutions proposed here.

A source array in[ ] comprises registers 301 to 303 in which the elements in0 to in$_{n-1}$ are stored. The source array is designed as a cyclic shift register, wherein the output of the element 303 is coupled to the input of the element 301. n elements can be stored in the shift register.

The content of the respective register 301 to 303 is fed to a multiplexer 304 which is controlled by a control unit 305. It is thus possible for the signals of the registers 301 to 303 to be provided depending on the control of the control unit 305 at the output of the multiplexer 304.

A target array out[ ] comprises registers 309 to 311 in which the elements out0 to out$_{n-1}$ are stored. A multiplexer 306 to 308 is disposed in front of each of the registers 309 to 311. Each of the multiplexers 306 to 308 has two inputs and one output. Each multiplexer 306 to 308 furthermore comprises a control input which can be controlled by means of the control unit 305. For each of the multiplexers 306 to 308, the control unit 305 specifies accordingly which of the two inputs is intended to be connected to the output.

The first input of the multiplexer 306 is connected to the output of the multiplexer 304. The second input of the multiplexer 306 is connected to the output of the register 311. The output of the multiplexer 306 is connected to the input of the register 309.

The first input of the multiplexer 307 is connected to the output of the multiplexer 304. The second input of the multiplexer 307 is connected to the output of the register 309. The output of the multiplexer 307 is connected to the input of the register 310.

This connection scheme is continued accordingly until the last multiplexer 308, the first input of which is connected to the output of the multiplexer 304 and the second input of which is connected to the output of the preceding register (not shown in FIG. 3). The output of the multiplexer 308 is connected to the input of the register 311.

On the basis of the arrangement shown in FIG. 3, it is possible for the values from the source array to be placed at different positions of the target array. A random access, for example, to the elements of the respective arrays can be achieved here.

The control unit 305 thus enables a targeted selection of an element of the source array which is then written to a specific position in the target array. During each write procedure, the remaining elements of the two arrays can be exchanged cyclically through the shift register design.

Although the invention has been illustrated and described in greater detail by means of the at least one example embodiment shown, the invention is not limited thereto and other variations may be derived therefrom by the person skilled in the art without departing the protective scope of the invention.

The invention claimed is:

1. A method for copying data elements of a source array into a target array, wherein both the source array and the target array have at least two data elements, wherein each data element has a value, the method comprising:
    copying the data elements of the source array into the target array in the sequence of a permutation of the order in which the data elements appear in the source array,
    wherein after each copying of a data element of the source array into the target array, the source array, the target array, or the source array and the target array are permutated.

2. The method of claim 1, in which at least one cyclic shift register is provided for the source array and the target array to store the at least two data elements.

3. The method of claim 1, in which a loop is provided which predefines a number of iterations which corresponds to the number of the at least two data elements, wherein, for each iteration,
    the value is copied from the source array into the target array according to the sequence of the random permutation,
    the source array and the target array are rotated through a predefined position.

4. The method of claim 1, in which a loop is provided which predefines a number of iterations which corresponds to the number of the at least two data elements, wherein, for each iteration,
    the value is copied from the source array into the target array according to the sequence of the permutation,
    the source array is rotated through a first number of positions, wherein the first number is defined by a first digit,
    the target array is rotated through a second number of positions, wherein the second number is defined by a second digit,
    wherein the first random number and the second random number are in each coprime to the number of data elements of the respective array.

5. The method of claim 4, in which the first number and/or the second number is/are in each case a random number or a deterministically defined number.

6. The method of claim 4, in which the first number and the second number are defined for the total number of iterations.

7. The method of claim 1, wherein the copying is for the initialization of at least one key register.

8. The method of claim 1, in which each data element has a value which is representable by at least one bit.

9. A non-transitory computer-readable storage medium comprising instructions executable by a computer which are suitable so that the computer carries out steps of the method as claimed in claim 1.

10. The method of claim 1, wherein the data elements copied from the source array to the target array are elements of a cryptographic key.

11. A device for copying data elements of a source array into a target array, wherein both the source array and the target array have at least two data elements, wherein each data element has a value, the device comprising a processing circuit configured to carry out the following steps:
    copying the data elements of the source array into the target array in the sequence of a permutation of the order in which the data elements appear in the source array,
    rotating the source array, the target array or the source array and the target array after each copying of a data element of the source array into the target array.

12. The method of claim 11, wherein the data elements copied from the source array to the target array are elements of a cryptographic key.

* * * * *

UNITED STATES PATENT AND TRADEMARK OFFICE
CERTIFICATE OF CORRECTION

PATENT NO. : 11,476,872 B2
APPLICATION NO. : 16/504863
DATED : October 18, 2022
INVENTOR(S) : F. Mendel et al.

It is certified that error appears in the above-identified patent and that said Letters Patent is hereby corrected as shown below:

On the Title Page

Item [30], insert Foreign App. Priority Data:
-- 102018116572.2 DE 2018-07-09 --.

Signed and Sealed this
Third Day of January, 2023

Katherine Kelly Vidal
*Director of the United States Patent and Trademark Office*